(12) United States Patent
Bruening et al.

(10) Patent No.: US 8,584,710 B2
(45) Date of Patent: Nov. 19, 2013

(54) APPARATUS FOR PREVENTING FLUID SPRAY AT LEAKAGE AREAS OF A FLUID PIPE

(75) Inventors: Timo Bruening, Bremen (DE); Rolf Goessing, Bremen (DE); Norbert Rostek, Osterholz-Scharmbeck (DE)

(73) Assignee: Airbus Operations GmbH (DE)

( * ) Notice: Subject to any disclaimer, the term of this patent is extended or adjusted under 35 U.S.C. 154(b) by 826 days.

(21) Appl. No.: 12/652,102

(22) Filed: Jan. 5, 2010

(65) Prior Publication Data

US 2010/0170576 A1 Jul. 8, 2010

Related U.S. Application Data

(60) Provisional application No. 61/204,320, filed on Jan. 5, 2009.

(30) Foreign Application Priority Data

Jan. 5, 2009 (DE) .......................... 10 2009 003 938

(51) Int. Cl.
*F16L 57/00* (2006.01)

(52) U.S. Cl.
USPC ............ 138/110; 138/114; 138/128; 138/169

(58) Field of Classification Search
USPC .................................. 138/110, 114, 128, 169
See application file for complete search history.

(56) References Cited

U.S. PATENT DOCUMENTS

| 2,408,253 | A | * | 9/1946 | Diebold ......................... 174/136 |
| 2,867,242 | A | * | 1/1959 | Harris et al. .................. 285/114 |
| 4,181,157 | A | * | 1/1980 | DeCamp ........................ 138/126 |
| 4,244,482 | A | * | 1/1981 | Baumgart et al. ............ 220/586 |
| 5,836,357 | A | * | 11/1998 | Kittson et al. .................. 138/98 |
| 5,873,391 | A | * | 2/1999 | Kittson et al. .................. 138/98 |
| RE37,279  | E | * | 7/2001 | Fisher et al. .................. 138/156 |
| 6,775,992 | B2 | * | 8/2004 | Cooper ........................... 62/50.7 |
| 2007/0200031 | A1 |  | 8/2007 | Deharde et al. |
| 2008/0190506 | A1 | * | 8/2008 | Cleveland ...................... 138/110 |
| 2008/0302436 | A1 | * | 12/2008 | Elowitz ........................... 138/110 |

FOREIGN PATENT DOCUMENTS

| DE | 3330837 A1 | 4/1984 |
| DE | 102004021245 A1 | 12/2005 |
| GB | 2126313 A | 3/1984 |

* cited by examiner

*Primary Examiner* — James Hook
(74) *Attorney, Agent, or Firm* — Lerner, David, Littenberg, Krumholz & Mentlik, LLP

(57) ABSTRACT

Apparatus for preventing fluid spray at a leakage area of a fluid pipe comprises at least one first enveloping element and at least one second enveloping element which encloses the fluid pipe so as to be flush with it, and which are circumferentially interrupted, wherein the circumferential interruptions of the enveloping elements are arranged so as to be offset relative to each other. In this way, fluid spray formation may be prevented in an economical way. The simple design ensures easy installation and economical production.

9 Claims, 2 Drawing Sheets

APPARATUS FOR PREVENTING FLUID SPRAY AT LEAKAGE AREAS OF A FLUID PIPE

CROSS-REFERENCE TO RELATED APPLICATIONS

This application claims the benefit of the filing date of U.S. Provisional Patent Application No. 61/204,320 filed Jan. 5, 2009, the disclosure of which application is hereby incorporated herein by reference.

BACKGROUND OF THE INVENTION

The invention relates to an apparatus for preventing fluid spray at leakage areas of a fluid pipe, to the use of such apparatus, and to an aircraft comprising at least one item of the apparatus for preventing fluid spray at leakage areas of a fluid pipe.

Below, aspects of the invention relating to hydraulic fluids and to their use in commercial aircrafts are described. However, this is to be understood only in an exemplary manner. The aspects of the invention may be transferred to other types of fluid pipes. Likewise, the use is not limited to aircrafts; instead, any fluid pipes that have been installed so as to be stationary, or that have been installed in whatever type of vehicles or equipment with sensitive regions, could be considered.

In today's commercial aircrafts, hydraulic systems are frequently used in order to handle a variety of tasks, for which hydraulic systems with multiple hydraulic fluid pipes are required. The pressure level within these pipes ranges up to 350 bar. If damage to a hydraulic fluid pipe occurs, be it as a result of selective corrosion or pitting, or as a result of a fracture, hydraulic fluid may issue. In major leakages, a fluid jet may form which diffuses fluid into the space surrounding the hydraulic fluid pipe. In this context, it may happen that sensitive equipment or apparatus is exposed to hydraulic fluid and is possibly damaged as a result of this exposure. In addition, the impact of the emanating hydraulic fluid jet may result in local sprinkling or spraying of the hydraulic fluid jet, which results in additional large-area soiling of the region concerned. Depending on the general conditions, a leakage could result in the spraying of hydraulic fluid already at the point where it issues, and consequently a large region around the leakage area could become soiled.

Apart from the danger of soiling or damaging equipment or apparatus in a sensitive region, in the case of the spraying of a hydraulic fluid, there is also a danger of a combustible air/hydraulic fluid mixture forming, which would jeopardise safe operation of the aircraft.

In the state of the art, there is equipment that is used to protect against leakages or soiling when leakages do occur. It is known to use a protective shield between a potential leakage area and the surroundings to be protected. However, this requires sufficient design space and sufficient knowledge as to the positions at which, for example, a hydraulic fluid pipe might develop a leak.

German patent application no. DE 102004021245 A1 and U.S. patent application publication no. 2007/0200031 A1 disclose apparatus to protect against leakages, which apparatus is in the form of an arrangement comprising a pipe and a protective tube. The protective tube fully encloses the pipes so that in the case of a leak in the pipe the conveyed liquid is retained in the protective tube rather than issuing into the surroundings. However, this device is designed for use on fuel lines in aircraft, which fuel lines only have a pressure level of a few bar. Due to the high pressure level, the use with hydraulic fluid pipes would be uneconomical, because the apparatus would have to be massive, heavy and cost-intensive.

BRIEF SUMMARY OF THE INVENTION

Accordingly, it is the object of the invention to propose apparatus for preventing fluid spray at leakage areas of a fluid pipe, which apparatus reduces or entirely removes at least some of the disadvantages described above. In particular, it is an object of the invention to propose apparatus in which uncontrolled spraying of a highly pressurised hydraulic fluid is prevented. It is a further object of the invention to prevent fluid spray formation.

This object is met by apparatus for preventing fluid spray at leakage areas of a fluid pipe, to the use of such apparatus, and to an aircraft comprising at least one such item of apparatus according to the independent claims. Various exemplary embodiments of the present invention are described in the dependent claims.

The apparatus according to the invention comprises at least one first enveloping element that encloses a fluid pipe so as to be flush with it. In order to facilitate installation of such an enveloping element, which could be necessary in particular for retrofitting in the case of already fixed fluid pipes, the enveloping element is flexible and preferably circumferentially not entirely closed. In concrete terms, this means that the enveloping element comprises a circumferential interruption and, for example, a longitudinal incision, as a result of which the enveloping element may be placed onto the fluid pipe.

Basically, a case could occur in which the fluid pipe develops a leak precisely at the position of the longitudinal incision of the enveloping element. Fluid spray formation would then be possible at that location. In order to prevent this, the apparatus according to the invention comprises at least a second enveloping element, which encloses the first enveloping element so as to be flush with it. For simplified installation, the second enveloping element also comprises a circumferential interruption and, for example, a longitudinal incision, so that said second enveloping element may be placed relatively easily onto the first enveloping element.

In this process, it is necessary to prevent the circumferential interruptions of the enveloping elements from being placed precisely one on top of the other; instead, they need to be offset relative to each other. Consequently, fluid might issue through the circumferential interruption of the first enveloping element, but then encounters the second enveloping element.

Due to the high pressure level of up to 350 bar with the use of a hydraulic fluid pipe in an aircraft, the apparatus according to the invention is not primarily designed to completely block issuing hydraulic fluid. The apparatus according to the invention is primarily intended to prevent fluid spray formation and associated soiling of the surroundings, to prevent a potentially explosive mixture from forming, and to prevent soiling of a region surrounding the hydraulic fluid pipes or to prevent soiling or functional impediment of other aircraft components as a result of impingement by direct spray of hydraulic fluid.

In a preferred embodiment of the apparatus according to the invention, the first and the second enveloping elements are hose bodies. The hose bodies are not entirely closed circumferentially so that they may easily be pulled over the fluid pipe.

The material of the hose bodies could be selected depending on the fluid, for it should be considered that a leakage could occur during a long flight, and the enveloping elements would continuously be impinged on by hydraulic fluid. Should the hose material that is used not be resistant to, for example, hydraulic fluid (Skydrol® is, for example, widely used in aircraft), the hose might disintegrate in some regions so that after some time already renewed fluid spray formation would occur. The enveloping elements may comprise a single-layer or a multi-layer design, wherein the layers may comprise various materials. Also, the material properties should be chosen for reducing a cutting effect caused by a leakage fluid spray.

Preferably, each enveloping element comprises a longitudinal slit that extends parallel to the longitudinal axis of the enveloping elements and of the hydraulic pipes. In this way, it may be ensured that the circumferential interruptions of the first and of the second enveloping elements are arranged so as to be offset relative to each other.

As an alternative, one or both of the enveloping elements may comprise a perforated area instead of a slit. The perforated area is positioned so as to be offset to the slit or the perforated area of the other enveloping element. The material of this perforated area may be a metallic material or a plastic material, depending on the flow rate, pressure and kind of fluid. For example, a perforated metallic sheet would be beneficial for high pressure Skydrol® pipes.

It should be pointed out that characteristics and side effects of the present invention have been described with reference to various embodiments of the invention. Further characteristics, advantages and application options of the present invention are stated in the following description of the exemplary embodiment and of the figures. In this document all the described and/or illustrated characteristics per se and in any desired combination form the subject of the invention, even irrespective of their composition in the individual claims or their related claims.

BRIEF DESCRIPTION OF THE DRAWINGS

Identical or similar components in the figures have the same reference characters.

DETAILED DESCRIPTION

Figure 1:
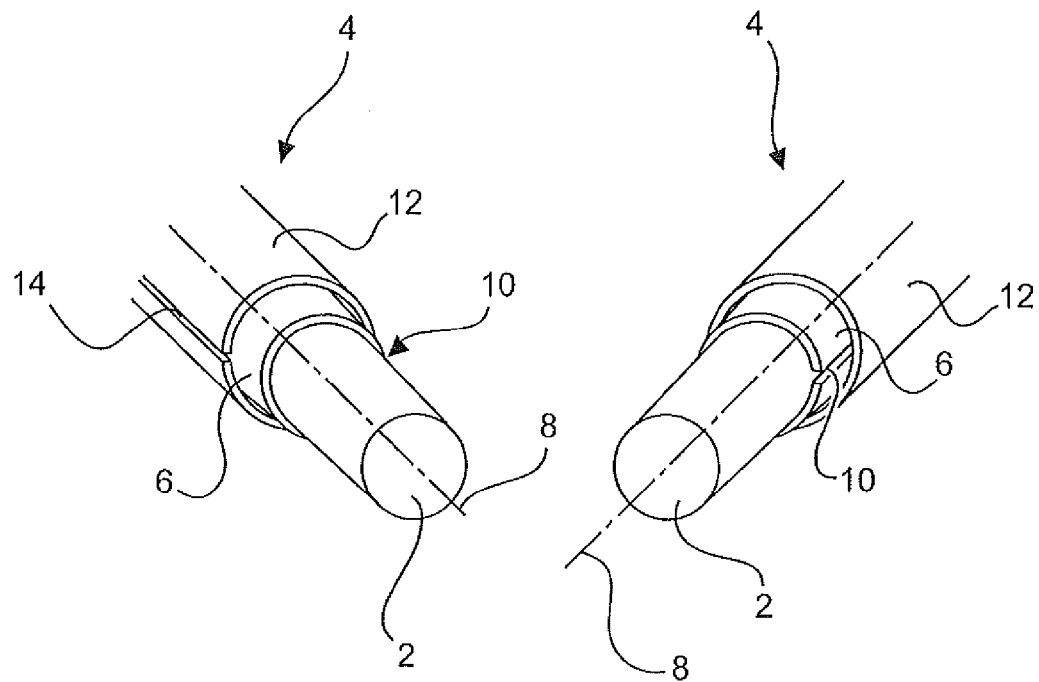
FIG. 1 shows a diagrammatic overview of an apparatus according to the invention.

FIG. 1 shows two different views of a fluid pipe 2, for example for hydraulic fluids, on which fluid pipe 2 apparatus 4 according to the invention is arranged. A first enveloping element 6, implemented in the form of a hose, encloses the hydraulic fluid pipe 2 so as to be flush with it. The illustration shows that the first enveloping element 6 comprises a slit 10 that extends parallel to the longitudinal axis 8 of the hydraulic fluid pipe. The slit makes it possible to open the cross section of the first enveloping element 6 so that it may be laterally snapped onto the hydraulic fluid pipe 2. The material of the first enveloping element 6 is preferably correspondingly flexible and elastic so that it automatically reverts to its enclosing shape after it has been bent apart in the region of the slit 10.

A second enveloping element 12 encloses the first enveloping element 6 and also comprises a slit 14 that extends parallel to the longitudinal axis 8 of the hydraulic fluid pipe.

The apparatus 4 according to the invention is preferably arranged in the aircraft in those positions that are associated with a particularly great risk of endangering other components or the surroundings in general. If in such a region a leakage occurs on the circumference of the hydraulic fluid pipe 2, fluid spray is effectively prevented from occurring, and the kinetic energy of the issuing fluid is taken up by the apparatus 4 according to the invention. Consequently, the issuing hydraulic liquid drips from the slits 10 and 14 or from the ends of the apparatus 4 according to the invention and is thus easier to handle.

The device 4 according to the invention effectively prevents fluid from spraying onto other components. Likewise, the apparatus 4 according to the invention comprises a very simple design, is economical to produce and easy to install.

Figure 2:
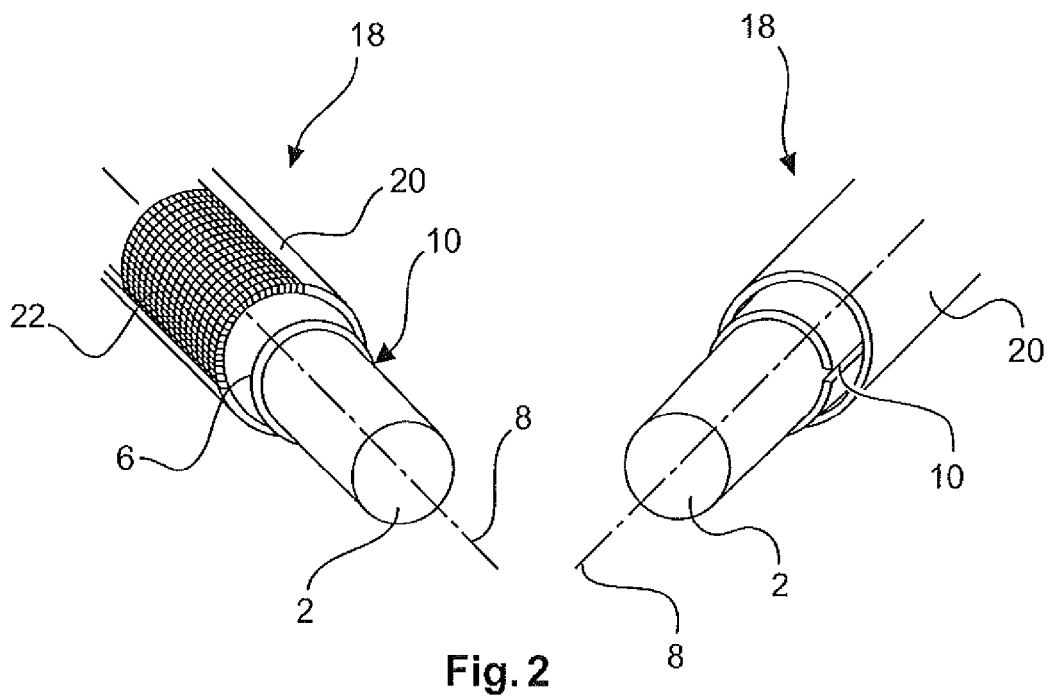
FIG. 2 shows a diagrammatic overview of an apparatus according to the invention.

In FIG. 2, an alternate apparatus 18 according to the invention is shown. There, the fluid pipe 2 is partially surrounded by the apparatus 18 according to the invention comprising the first enveloping element 6 that is also implemented in the form of a hose with a slit 10. A second enveloping element 20 encloses the first enveloping element 6 and comprises a perforated area 22 instead of a slit as in FIG. 1. The perforated area 22 is positioned so as to be offset from the slit 10 of the first enveloping element 10. Consequently, a fluid spray is prevented and the hydraulic fluid merely drips from the ends of the apparatus 18 or the perforated area 22 and is thus easier to handle.

The perforated area may be realized as a grid or a perforated sheet made from a metallic material or a plastic material, and may be integrated into the related enveloping element by way of a welding, adhesive bonding, vulcanizing or other suitable bonding method.

Figure 3:
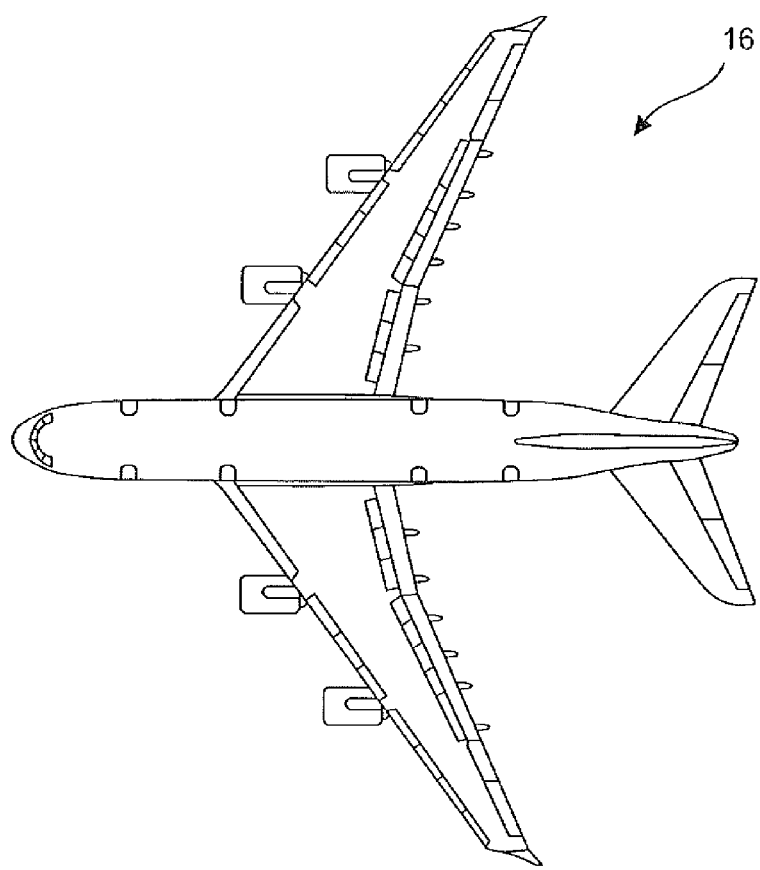
FIG. 3 shows an aircraft with at least one item of apparatus according to the invention.

FIG. 3 shows an aircraft 16 that comprises several hydraulic systems and preferably could comprise at least one item of apparatus 4 according to the invention.

In addition, it should be pointed out that "comprising" does not exclude other elements or steps, and "a" or "one" does not exclude a plural number.

LIST OF REFERENCE CHARACTERS 2 (Hydraulic) fluid pipe
4 Apparatus according to the invention
6 First enveloping element
8 Middle axis
10 Slit of the first enveloping element
12 Second enveloping element
14 Slit of the second enveloping element
16 Aircraft
18 Apparatus according to the invention
20 Second enveloping element
22 Perforated area

The invention claimed is:
1. An apparatus for preventing fluid spray at leakage areas of a fluid pipe, comprising:
  at least one first enveloping element made of a flexible material; and
  at least one second enveloping element made of a flexible material;
  wherein the first enveloping element for the flush enclosing of a region of the fluid pipe comprises a shape corresponding to the region of the fluid pipe;
  wherein the second enveloping element for the flush enclosing of the first enveloping element comprises a shape corresponding to the first enveloping element;
  wherein the first and the second enveloping elements are circumferentially interrupted;

wherein the circumferential interruption of the first enveloping element is configured to leave the fluid pipe substantially uncovered along the circumferential interruption;

wherein the circumferential interruption of the first or the second enveloping element is configured as a perforated area; and wherein the circumferential interruption of the second enveloping element is arranged so as to be offset relative to the circumferential interruption of the first enveloping element.

2. The apparatus of claim 1, wherein the circumferential interruption of the first or the second enveloping element is configured as a longitudinal incision.

3. The apparatus of claim 1, wherein the first and the second enveloping elements are implemented as hose bodies.

4. The apparatus of claim 1, wherein the first and the second enveloping element for adaptation so as to be flush with each other are elastic and resilient.

5. The apparatus of claim 1, wherein the apparatus does not comprise a completely closed outer layer.

6. The apparatus of claim 1, wherein the circumferential interruption of the second enveloping element is configured as a perforated area.

7. An aircraft comprising at least one fluid pipe and at least one item of apparatus for preventing fluid spray at leakage areas of a fluid pipe, comprising:

at least one first enveloping element made of a flexible material; and at least one second enveloping element made of a flexible material;

wherein the first enveloping element for the flush enclosing of a region of the fluid pipe comprises a shape corresponding to the region of the fluid pipe;

wherein the second enveloping element for the flush enclosing of the first enveloping element comprises a shape corresponding to the first enveloping element;

wherein the first and the second enveloping elements are circumferentially interrupted;

wherein the circumferential interruption of the first enveloping element is configured to leave the fluid pipe uncovered substantially along the entire length of the first enveloping element;

wherein the circumferential interruption of the first or the second enveloping element is configured as a perforated area; and wherein the circumferential interruption of the second enveloping element is arranged so as to be offset relative to the circumferential interruption of the first enveloping element.

8. An apparatus for preventing fluid spray at leakage areas of a fluid pipe, comprising:

at least one first enveloping element; and at least one second enveloping element;

wherein the first enveloping element for the flush enclosing of a region of the fluid pipe comprises a shape corresponding to the region of the fluid pipe;

wherein the second enveloping element for the flush enclosing of the first enveloping element comprises a shape corresponding to the first enveloping element;

wherein the first and the second enveloping elements are circumferentially interrupted;

wherein the first enveloping element is circumferentially interrupted substantially along the entire length of the apparatus; and wherein the circumferential interruption of the second enveloping element is arranged so as to be offset relative to the circumferential interruption of the first enveloping element;

wherein the circumferential interruption of the first or the second enveloping element is configured as a perforated area; and wherein the apparatus is configured for dripping off issuing fluid from the interruptions of the first and second enveloping elements to the surrounding environment.

9. The apparatus of claim 8, wherein the apparatus does not comprise a completely closed outer layer.

* * * * *